US011573564B2

(12) United States Patent
Chen et al.

(10) Patent No.: US 11,573,564 B2
(45) Date of Patent: Feb. 7, 2023

(54) SMART DRONE PARKING

(71) Applicant: AT&T Intellectual Property I, L.P., Atlanta, GA (US)

(72) Inventors: Jackie Chen, Brooklyn, NY (US); Kevin Ackerman, Toms River, NJ (US); Clayton Cotton, Metuchen, NJ (US); Roque Rios, III, Middletown, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 154 days.

(21) Appl. No.: 17/191,203

(22) Filed: Mar. 3, 2021

(65) Prior Publication Data

US 2022/0283580 A1 Sep. 8, 2022

(51) Int. Cl.
*G05D 1/00* (2006.01)
*G05D 1/10* (2006.01)
*G06K 19/06* (2006.01)
*B64C 39/02* (2006.01)
*G08G 5/00* (2006.01)

(52) U.S. Cl.
CPC ......... *G05D 1/0022* (2013.01); *B64C 39/024* (2013.01); *G05D 1/0027* (2013.01); *G05D 1/104* (2013.01); *G06K 19/06037* (2013.01); *G08G 5/003* (2013.01); *B64C 2201/128* (2013.01); *B64C 2201/141* (2013.01)

(58) Field of Classification Search
CPC .... G05D 1/0022; G05D 1/0027; G05D 1/104; B64C 39/024; B64C 2201/128; B64C 2201/141; G06K 19/06037; G08G 5/003
USPC .......................................................... 701/3
See application file for complete search history.

(56) References Cited

U.S. PATENT DOCUMENTS

| 11,094,146 B1* | 8/2021 | Mash | G07C 5/0808 |
| 2020/0310408 A1* | 10/2020 | Carper | G08G 5/0039 |
| 2021/0073715 A1* | 3/2021 | Yamada | B60L 58/12 |
| 2021/0116941 A1* | 4/2021 | Lee | G01S 17/894 |

\* cited by examiner

*Primary Examiner* — Muhammad Shafi
(74) *Attorney, Agent, or Firm* — Amin, Turocy & Watson, LLP

(57) ABSTRACT

An architecture to provision one-stop parking, charging, storage, and/or maintenance facilities and/or functionalities for drone equipment. A method can comprise identifying a drone entering a defined airspace monitored by the network equipment; in response to establishing a communication channel with the drone, receiving data representing a physical dimension associated with the drone; based on the physical dimension associated with the drone, allocating a space within a defined area to which the drone is to navigate and then cease moving; and sending, to the drone via the communication channel, notification data that notifies the drone to navigate to the space.

20 Claims, 10 Drawing Sheets

SMART DRONE PARKING

TECHNICAL FIELD

The disclosed subject matter provides systems and methods for the provision a one-stop parking, charging, storage, and/or maintenance facilities and/or functionalities for drone equipment.

BACKGROUND

Drone technologies, as applied to drone equipment, such as unmanned aerial vehicles, unmanned motorized terrestrial based vehicles, unmanned space and/or aerospace vehicles, and the like, is an emerging technology, and as yet have not been used to their maximum potential. In the impending future, it is contemplated that fleets of drone equipment will be used for a wide array of tasks. Illustrative tasks can range from package delivery to various destinations—terrestrial, airborne, and/or in space—as well as a plethora of military and/or security operations. It is further envisaged that in the not-too-distant future that our skies in the proximate orbit of our planet, as well as the skies and orbits of our planetary neighbors, will be filled with drone equipment.

DETAILED DESCRIPTION

Figure 1:
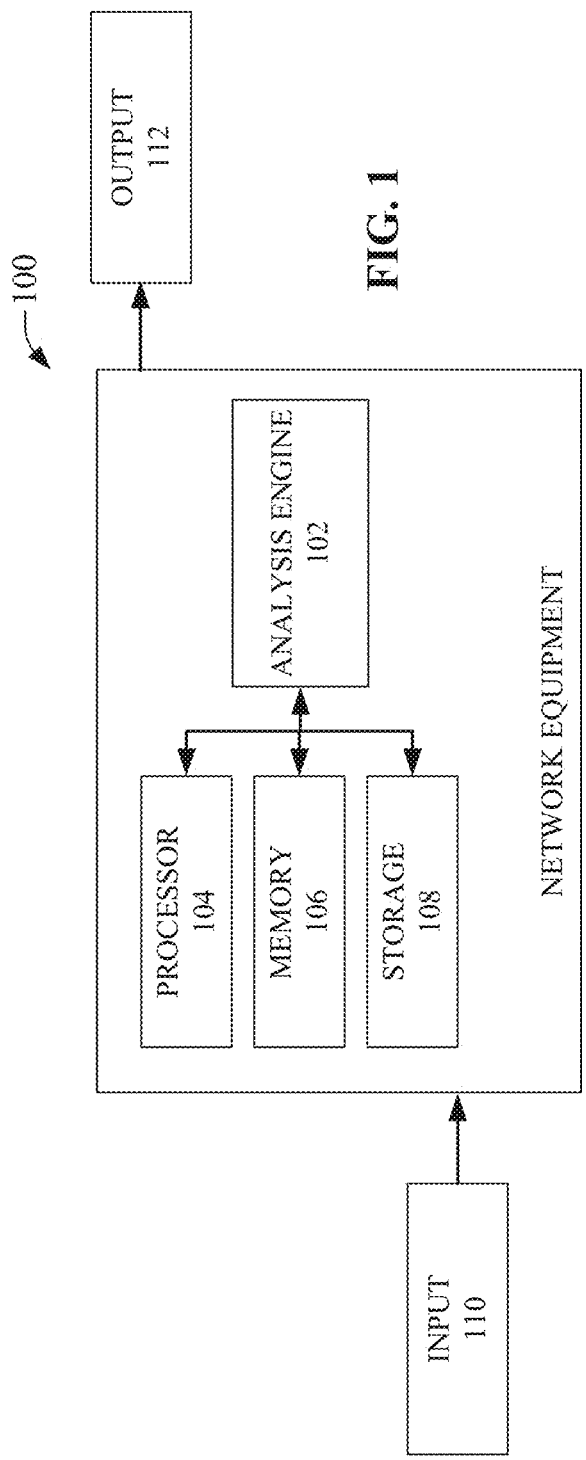
FIG. 1 is an illustration of a system for provisioning of one-stop parking, charging, storage, and/or maintenance facilities and/or functionalities for drone equipment, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed systems and methods, in accordance with various embodiments, provide a system, apparatus, equipment, or device comprising: a processor, and a memory that stores executable instructions that, when executed by the processor, facilitate performance of operations. The operations can comprise identifying drone equipment entering a defined airspace monitored by the network equipment; establishing a communication channel with the drone equipment; in response to establishing the communication channel, receiving data representing a physical dimension associated with the drone equipment; based on the physical dimension associated with the drone equipment, allocating a parking space within a defined area for the drone equipment to land; and transmitting, via the communication channel, message data representing a message to the drone equipment that the drone equipment navigate to the parking space.

Additional operations can comprise using a group of sensors to track the drone equipment in response to the drone equipment being determined to have entered the defined airspace. In some embodiments the group of sensors can comprise a radar sensor. In other illustrative embodiments the group of sensors comprises a lidar sensor. In some example embodiments the group of sensors comprises camera equipment that captures first electromagnetic radiation associated with first wavelengths longer than visible light wavelengths associated with a humanly perceivable light spectrum. In various embodiments the camera equipment further captures second electromagnetic radiation associated with second wavelengths shorter than the visible light wavelengths. In additional and/or alternative embodiments the camera equipment further captures second electromagnetic radiation associated with the visible light wavelengths.

Further operations can comprise identifying the drone equipment based on identifying markings attached to a surface skin of the drone equipment. In some embodiments the identifying markings comprise multidimensional bar code data. In various other embodiments the identifying markings comprise quick response code data. In further additional and/or alternative embodiments identifying markings comprise regulatory tag data, wherein the regulatory tag data uniquely identifies the drone equipment as being registered with a regulatory governmental entity that regulates flying objects.

In accordance with further embodiments, the subject disclosure describes a method and/or process, comprising a series of acts that, for example, can include: identifying, by equipment comprising a processor, a drone device entering a defined airspace monitored by the equipment; establishing, by the equipment, a communication channel with the drone device; in response to establishing the communication channel, receiving, by the equipment, data representing a physical dimension associated with the drone device; based on the physical dimension associated with the drone device, allocating, by the equipment, a landing space within a defined area for the drone device to land; and transmitting, by the equipment to the drone device via the communication channel, message data indicating to the drone device that the drone device navigate to the landing space.

Further acts can include receiving, by the equipment, data detailing a freight being carried by the drone device; based on the data detailing the freight being carried by the drone device, allocating a secure storage area for the drone device to use to offload the freight. In some illustrative embodiments the secure storage area is contiguous with the defined area. In additional and/or alternative embodiments the secure storage area is remote from the defined area, wherein the message data further indicates to the drone device that the drone device is to navigate to the secure storage area to offload the freight.

Additional act can include querying, by the equipment, a data store to access, based on identification markings affixed to or integrated with a skin of the drone device, data representing a location of charging ports associated with the drone device; and querying, by the equipment, a data store to access, based on identification markings affixed to or integrated with a skin of the drone device, data representing a location of physical access and physical communication ports associated with the drone device.

In accordance with still further embodiments, the subject disclosure describes a machine readable medium, a computer readable storage device, or non-transitory machine readable media comprising instructions that, in response to execution, cause a computing system (e.g., equipment, devices, groupings of devices, etc.) comprising at least one processor to perform operations. The operations can include: identifying a drone entering a defined airspace monitored by the network equipment; in response to establishing a communication channel with the drone, receiving data representing a physical dimension associated with the drone; based on the physical dimension associated with the drone, allocating a space within a defined area to which the drone is to navigate and then cease moving; and sending, to the drone via the communication channel, notification data that notifies the drone to navigate to the space.

Additional operations can include using a multiparty block chain verification process to determine an identity of an owner entity associated with ownership of the drone.

Currently drone equipment (e.g., unmanned aerial vehicles, unmanned motorized terrestrial based vehicles, unmanned aerospace vehicles, manned partially automated vehicles, unmanned waterborne vessels, and the like) operators must typically monitor each of their drone equipment and make individual logistical decisions as to what maintenance, charging, and/or storage solutions that they will need to utilize at defined or definable periods of time. For instance, when particular drone equipment will need maintenance; when batteries associated with identified drone equipment will need to be charged or replaced; and when and where drone equipment should be stored (e.g., parked) when it is not in service (e.g., operational).

It is believed in the near prospective future that when use drone equipment becomes prominent in the world, drone equipment operators will require safe, smart, and unproblematic locations as to where to facilitate and/or effectuate parking, overhaul, and/or maintenance of their drone equipment. In a manner similar to current parking, docking, maintenance, and/or traffic solutions for automotive vehicles, such as automobiles, long distance transportation vehicles, maritime shipping vessels, aircraft, and the like, it is expected that facilities will also be needed for fleets of unmanned vehicles, unmanned aerial vehicle, and unmanned vessels. Additionally, while it is possible to land and/or park unmanned aerial vehicles on regular parking lots or other relatively level surfaces, such as municipal parks, etc. none of these locations provide maintenance and/or service facilities for drone equipment. The disclosed and detailed systems, methods, and equipment will provide many services, such as refueling, charging and/or recharging of batteries, shipping parcel or package storage facilities, drone equipment diagnostics facilities, transit facilities, package store and forward functionalities, customs clearance facilities, computer-vision based parking, and the like.

With reference to the Figures, FIG. 1 illustrates network equipment 100 (occasionally referred to as system 100) that provides one-stop parking, charging, storage, and/or maintenance facilities and/or functionalities for drone equipment. As illustrated network equipment 100 can comprise analysis engine 102 that can be communicatively coupled to processor 104, memory 106, and storage 108. Analysis engine 102 can be in communication with processor 104 for facilitating operation of computer and/or machine executable instructions and/or components by analysis engine 102, memory 106 for storing data and/or the computer or machine executable instructions and/or components, and storage 108 for providing longer term storage for data and/or machine and/or computer machining instructions. Additionally, network equipment 100 can receive input 100 for use, manipulation, and/or transformation by analysis engine 102 to produce one or more useful, concrete, and tangible result, and/or transform one or more articles to different states or things. Further, network equipment 100 can also generate and output the useful, concrete, and tangible results, and/or the transformed one or more articles produced by analysis engine 102, as output 102.

In some embodiments, network equipment 100 can be Internet of Things (IoT) small form factor equipment capable of effective and/or operative communication with a network topology. Additionally in alternative embodiments, network equipment 100 can be any type of mechanism, machine, device, apparatus, equipment, and/or instrument that can be utilized to provide one-stop parking, charging, storage, and/or maintenance facilities and/or functionalities for drone equipment. Example types of mechanisms, equipment, machines, devices, apparatuses, and/instruments can include virtual reality (VR) devices, wearable devices, heads up display (HUD) devices, machine type communication devices, and/or wireless devices that communicate with radio network nodes in a cellular or mobile communication system.

In various other embodiments, network equipment 100 can comprise tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aeronautical/avionic devices associated with, for example, orbiting satellites and/or associated aeronautical vehicles, and the like.

Network equipment 100 can be one of a group of network equipment that are in communication with one another to provide a system of drone equipment parking stations that coordinate with each other and with drone equipment within the vicinity of one or more of the group of network equipment. Typically the group of network equipment can automate the management of parking, refueling, charging or recharging batteries associated with drone equipment, and other service and/or maintenance issues. Generally, each network equipment (e.g., network equipment 100) can provide the following features in accordance with various disclosed embodiments. A computer vision-based artificial intelligence (AI) aspect to determine whether identified drone equipment can fit into a parking station. In regard to the foregoing, drone equipment can vary in construction and thus parking stations must ensure that the dimensions and/or interfaces associated with drone equipment are compatible with the facilities and/or functionalities supplied by the parking station.

In accordance with various computer vision-based AI embodiments, network equipment 100, as noted earlier, can comprise analysis engine 102. Analysis engine 102 can monitor airspace in proximity of the location of network equipment 100. Such monitoring of airspace can be accomplished with an array or groupings of disparate sensor equipment, such as one or more cameras that can detect electromagnetic radiation (e.g., radiation associated with wavelengths longer than those of visible light (infrared), radiation associated with wavelengths shorter than visible light (ultraviolet), and/or radiation associated with wavelengths in the humanly perceivable light spectrum (e.g., in the range of 400-700 nanometers (nm)), one or more equipment for measuring distances (ranging) by illuminating targets with laser light and measuring reflections with a panoply of sensors (e.g., lidar), detection equipment that uses radio waves to determine a range, angle, or velocity of a plethora of objects (e.g., radar), or any other deterministic technique. As will be appreciated by those of ordinary skill, the array or grouping of disparate sensors can vary with the size and scale of the parking station. Some parking stations will typically require smaller arrays of sensor equipment, whereas other parking stations can generally be provisioned with larger arrays of sensor equipment.

Analysis engine 102 can facilitate identifying drone equipment within a defined airspace surrounding network equipment 100 by causing one or more sensor equipment comprising the array of sensor equipment to lock onto the drone equipment for purposes of more accurately identifying drone equipment within its airspace. In accordance with these embodiments, the array of sensor equipment can scan the body of the drone equipment, recording its physical dimensions, its electrical charging interfaces, its identifying markings (e.g. federal aviation authority (FAA) tags, multidimensional barcode information (e.g., 2D, 3D, . . . nD (where n is a value greater than 1)) such as a quick response (QR) code, and similar information associated with details regarding any cargo that the identified drone equipment may be carrying as freight. Analysis engine 102 can then check with database equipment to determine whether there are parking spots which can support the combined dimensions of the identified drone equipment and its cargo. Analysis engine 102 can also consider the availability of compatible charging interfaces, if electrical charging of the identified drone equipment is required.

In various additional and/or alternative embodiments, another feature that can be provided by network equipment 100 (e.g., analysis engine 102) can be a multiparty verification system (e.g., block chain secured verification) that can be used to ensure that drone equipment attempting to park at the parking station under control of network equipment 100 has been registered to a recognized and/or registered owner, and furthermore, that the recognized and/or registered owner has pre-paid for services to be rendered, or has sufficient credit to cover any services to be rendered.

In accordance with the foregoing multiparty verification system or process, in response to analysis engine 102 having facilitated a visual inspection and evaluation of the incoming and identified drone equipment, analysis engine 102 can initiate communication with the drone equipment. Analysis engine 102 can effectuate communication with the drone equipment by scanning for open Bluetooth, NFC, or Wi-Fi connections from the incoming and identified drone equipment. Once analysis engine 102 has established communication (e.g., via a communication channel) with the drone equipment, analysis engine 102 can query the drone equipment to confirm that its specifications correlate with those visually identified using the previously described computer vision-based AI aspects. In response to analysis engine 102 having ascertained a correlation between the specifications received during communications with the drone equipment and the specifications identified using the previously described computer and vision-based AI aspects, analysis engine 102 can query the drone equipment for user entity data (e.g., data comprising details in regard to an organization or person that owns or is responsible for the identified drone equipment). Once analysis engine 102 is in receipt of the user entity data, analysis engine 102 can perform a search and query collections of database equipment as to whether or not the organization or person that owns, or is responsible for, the identified drone equipment has either pre-paid for services or has a valid line of credit on an associated account for the provision of services. If the organization or person that owns, or is responsible for, the identified drone equipment is a paying customer of the parking station associated with network equipment 100, analysis engine 102 can query the collections of database equipment to ascertain whether the incoming or approaching drone equipment belongs to a grouping of drone equipment for which the organization or person is responsible, and that the drone equipment is associated with a verified account for the provision of services. Once these constraints have been satisfied, analysis engine 102 can commence the process of communicating with the drone equipment to determine which services the drone equipment is requesting, and which of those services can be provided by the parking station.

In further additional and/or alternative embodiments, other features that can be provided by network equipment 100 (e.g., analysis engine 102) can be a protection system that can be used to prevent vandalism and piracy. In accordance with these embodiments, analysis engine 102 can cause one or more sensor devices (e.g., radar, lidar, cameras, . . . ) to identify and determine whether an approaching object is actually drone equipment or some other airborne object. In instances where the approaching object is not immediately recognized as being registered drone equipment, analysis engine 102 can establish communication, via Bluetooth, Wi-Fi, or NFC connection, with the approaching object. Once analysis engine 102 has established communication with the approaching object, analysis engine 102 can prompt the approaching object to identify itself and state its purpose. In response to analysis engine 102 determining, based at least in part on the established communication session with the approaching object, that the approaching object is a recognizable and registered drone equipment, analysis engine 102 can facilitate the recognized drone equipment to further approach the parking station. In instances where analysis engine 102 is unable to determine that the approaching object is associated with a group of recognizable and registered drone equipment, analysis engine 102 can request the approaching object to immediately leave the vicinity of the parking station and report the airspace incursion and approach of the object to relevant governmental authorities (e.g., FAA, security agencies, . . . ). Further, analysis engine 102 can generate and communicate, via the established communication session, warning messages to the approaching object that further action will be taken to immobilize the threat should the approaching object not vacate the air space that immediately and proximately surrounds the parking station.

In accordance with some embodiments, analysis engine 102 can monitor the parking station structure for drone equipment that is illegally parked within the parking station structure. When analysis engine 102 has ascertained that there are illegally parked drone equipment within the parking station structure, it can place a lock on the drone equipment. The lock generally will render the illegally parked drone equipment inoperable and not allow the illegally parked drone equipment to leave the parking station structure. Further, analysis engine 102 can notify the organization or person(s) responsible for the drone equipment that their drone equipment has been parked illegally, that the drone equipment at issue has currently been rendered inoperable until remedial actions (e.g., paying fees based at least in part on the duration for which the drone equipment has been parked illegally, the dimensions of the drone equipment, the weight of any cargo the drone equipment may have been carrying, or similar fees based, for example, on quantifiable metrics) have been undertaken, and that the drone equipment at issue has been moved and situated to a secured location under the control of parking station authorities. In regard to aerial detritus (e.g., windblown tree limbs, signage, and the like that can be a result of tornadoes, hurricanes, and other atmospheric events and/or disturbances) that can be detected using arrays of sensor devices, this can be dealt with by human intermediaries employed by the parking station.

In various additional and/or alternative embodiments, network equipment 100, via analysis engine 102, can provide a charging system that automatically determines the charging needs and requirements for drone equipment. In some embodiments, once drone equipment has been recognized and has successfully docked with parking station facilities, analysis engine 102 can adjust charging and/or interface apparatuses associated with the parking station infrastructure to match and/or correspond with counterpart charging and/or interface apparatuses associated with the docked network equipment. Analysis engine 102 can effectuate and/or facilitate adjusting the charging and/or interface apparatuses associated with the parking station infrastructure based at least in part on data that can have been communicated to it in earlier interactions between the incoming drone equipment and network equipment 100 (e.g., analysis engine 102). Illustrative examples of data that can have been communicated between drone equipment and analysis engine 102, can include make, model, type, and serial number of the drone equipment, the physical dimensions of the drone equipment, whether or not the drone equipment is carrying freight, bills of lading associated with the freight, customs declarations and excise forms associated with the freight, dangerous/hazardous goods declarations, weight of the freight being carried, weight of the drone equipment where the drone equipment has been modified from the original manufacture's specification, types of universal serial bus (USB) interfaces being used by the drone equipment, types of communication interfaces and interface protocols, power interface and current/voltage requirements being employed by the drone equipment, future destinations of the drone equipment when the drone equipment indicates that the current parking station stop is merely an intermediate transit stop for refueling/recharging in a longer scheduled journey, or any other relevant detail pertaining the drone equipment and, where necessary, its cargo.

Analysis engine 102, based on the data received during earlier communications or contemporaneous communications with drone equipment, can determine or measure, via an amp-hour meter, the battery life remaining in the drone equipment. Analysis engine 102, based at least in part on the determined battery life and whether or not the drone equipment is merely using parking station infrastructure as a refueling/recharging stop to complete a longer on-going trip, can determine whether or not the docked drone equipment is in need of an eleectrical charge. Analysis engine 102, in response to determining that drone equipment is need of a charge, for example, can initiate disposition of electrical charging facilities to effectuate the electrical charging of the docked drone equipment. In accordance with some embodiments, initiating disposition of electrical charging facilities to service the docked drone equipment can entail ensuring that a charging pad is placed in a location unto which the drone equipment can land. As drone equipment is charging, analysis engine 102 can monitor the charge being supplied to the drone equipment through use of measurement equipment, such as an amp-hour meter. Once analysis engine 102 determines that the batteries associated with drone equipment has attained full charge (or sufficient charge to facilitate the drone equipment's onward journey to a successful conclusion, or to a next parking station entity) analysis engine 102 can automatically cease the supply of charge to drone equipment.

Contemporaneously with charging or recharging docked drone equipment, analysis engine 102 can facilitate and/or effectuate other tasks associated with vital operating variables associated with drone equipment. Analysis engine 102, in some embodiments, based on logged records (e.g., operation records, maintenance records, or other similar records) that can be associated and maintained by the drone equipment itself, and/or logged records that can have been stored and cataloged to database equipment accessible to network equipment 100, can facilitate pre-flight diagnostics and testing of on-board equipment associated with the drone equipment to ensure that the drone equipment will make safe passage to its next destination or the next parking station. If analysis engine 102 determines that the drone equipment is, or may be, incapable of making and/or satisfying its proposed flight plan; may be unable to successfully carry out its mission; and/or may be unsuccessful in the delivery of any cargo it may be carrying, analysis engine 102 can generate and dispatch notifications to the organization or persons registered as owing or being responsible for the drone equipment at issue informing them that the drone equipment is incapable of completing its flight plan. Analysis engine 102 can determine whether malfunctioning drone equipment can be serviced and/or repaired that the parking station. In instances where servicing or repair to the malfunctioning drone equipment is not available at the parking station, analysis engine 102 can program the malfunctioning drone equipment with coordinates to another parking station where the drone equipment's maintenance needs can be fulfilled and satisfied. Where the malfunctioning drone equipment is carrying freight or cargo to further destinations, analysis engine 102 can effectuate and facilitate offloading of the freight to one or more other drone equipment for onward delivery. Similarly, when the malfunctioning drone equipment is carrying freight or cargo for onward delivery, analysis engine 102, where necessary and as authorized by a responsible party (e.g., agent of the owner or other parties with ownership interests in the malfunctioning drone equipment), can effectuate and/or facilitate offloading and storage of the freight or cargo to secured locations within the parking station.

In other example embodiments, network equipment 100 and analysis engine 102 can provide a cargo system for drone equipment traveling with cargo, such as packages. In accordance with this aspect, network equipment 100 can either protect the cargo while drone equipment is being serviced, and/or transfer the cargo if it is determined packages must be expedited beyond the ability of drone equipment. Accordingly, analysis engine 102 can identify drone equipment that request a space to park and can identify its associated cargo. Thereafter, analysis engine 102 can query associated database equipment to determine whether there currently are parking spots available to accommodate the drone equipment and whether there is room to store its associated cargo. Once analysis engine 102 has ensured that there is sufficient space to accommodate the drone equipment, the drone equipment can be notified that they are allowed to park in a defined location within or proximately around the parking station structure. Analysis engine 102 can then ask the incoming drone equipment whether its cargo is being picked up by a different incoming drone equipment or if the original drone equipment will be recovering the package when it departs the parking station. If different drone equipment is coming to remove the cargo, identification data associated with the different drone equipment can be supplied by the original drone equipment to analysis engine 102, and this data can be linked or mapped to data representing the cargo. If the original drone equipment will be tasked to carry its cargo to a further, possibly final destination, analysis engine 102 can associate identification data associated with the original drone equipment with data representing the cargo. Several viable data structures can be used to facilitate the association (or mappings) of identification data associated with drone equipment and data representing the cargo. For example, hierarchical tree structures can be used in some embodiments. In other embodiments, array data structures can be used. In further embodiments, linked lists can be utilized in conjunction with one or more array data structures. In still further embodiments, various hashed data structures can also be used with equal facility and effectiveness.

After associating the data associated with the cargo with identification data associated with the appropriate drone equipment, analysis engine 102 can allocate storage space within the parking space infrastructure for the secure storage of the cargo. In instances when drone equipment is carrying with cargo, prior to be directed to a parking location, analysis engine 102 can initially direct the drone equipment to the allocated storage space where the cargo can be offloaded, and then analysis engine 102 can direct the drone equipment to an allocated parking space or allocated docking location where, for example, charging or recharging of batteries, repair and other maintenance services can be carried out. In instances where drone equipment is leaving the parking station, or has been dispatched with the aim of forwarding the cargo to another (final) destination, drone equipment can be directed, by analysis engine 102, to a retrieval location where the cargo had previously been offloaded. It should be noted in regard to the praxis associated with departing the parking station facilities, since network equipment 100 and analysis engine 102, for the most part, control most, if not all, functional aspects of the parking station, analysis engine 102 will need to be notified when drone equipment is departing the parking station so that limited allocated resources, such as parking and storage spaces, can be reallocated for use by other incoming drone equipment, and control of traffic in the airspace surrounding the parking station can be appropriately monitored and maintained, by analysis engine 102.

In some embodiments, network equipment 100 and analysis engine 102 can provide a communication system that allows drone equipment from disparate operating entities (commercial and/or individual) to communicate with one another. In accordance with these embodiments, analysis engine 102 can act as a central hub that can communicate in all the "languages" that are used to communicate with drone equipment. Analysis engine 102 can initiate a first communication channel with a first drone equipment using a first language protocol and initiate a second communication channel with a second drone equipment using a second language protocol, wherein the first language protocol and the second language protocol are mutual unintelligible to one another. Once the first and second communication channels have been established, analysis engine 102 can receive first data communicated in the first language protocol from the first drone equipment and directed to the second drone equipment. Analysis engine 102 can convert the first data in the first language protocol to second data in the second language protocol, and then send the second data in the second language protocol to the second drone equipment. In this manner, while neither the first drone equipment nor the second drone equipment can directly communication with one another, by using analysis engine 102 as an intermediary language protocol translator and relay, each of the first drone equipment and the second drone equipment can communicate with one another, albeit indirectly. This facility offered by analysis engine 102 is important since as newer models of drone equipment are manufactured by drone equipment manufacturers, new more efficient protocols and languages are developed and used, which can lead to older drone equipment communicating and functioning using "obsolete" protocols and/or communicating in "archaic" and "mutually unintelligible" languages.

In regard to the foregoing disclosed solution, this solution can provide benefit to the foregoing parties: drone equipment owners, both commercial entities and individual owners, will be able to use their drone equipment to their fullest potential by reducing the issues associated with drone equipment usage, including unexpected or emergency stop; real property owners, both commercial and residential, who may receive payment for installing and utilizing the disclosed and described parking station solution and constructing the associated parking station structures on their properties; general consumers can benefit as they ultimately will receive their drone delivered package and parcels in a quicker and more reliable fashion; and regulatory bodies can benefit as the will be assisted in endpoint tracking by the transfer of drone equipment related data collected, ordered, ranked, and collated, based, for example, on FAA tag data or QR code data, by the disclosed system.

It should also be noted in regard to the foregoing solution that while it has been detailed in terms of aerial drone equipment, the disclosed systems and/or methods can have applicability in regard to unmanned oceanic shipping vessels, unmanned and/or partial manned motorized vehicles, such as interstate transportation vehicles, and the like.

In view of the example system(s) described above, example method(s) that can be implemented in accordance with the disclosed subject matter can be better appreciated with reference to the flowcharts and/or illustrative time sequence charts in FIGS. 2-8. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

Figure 2:
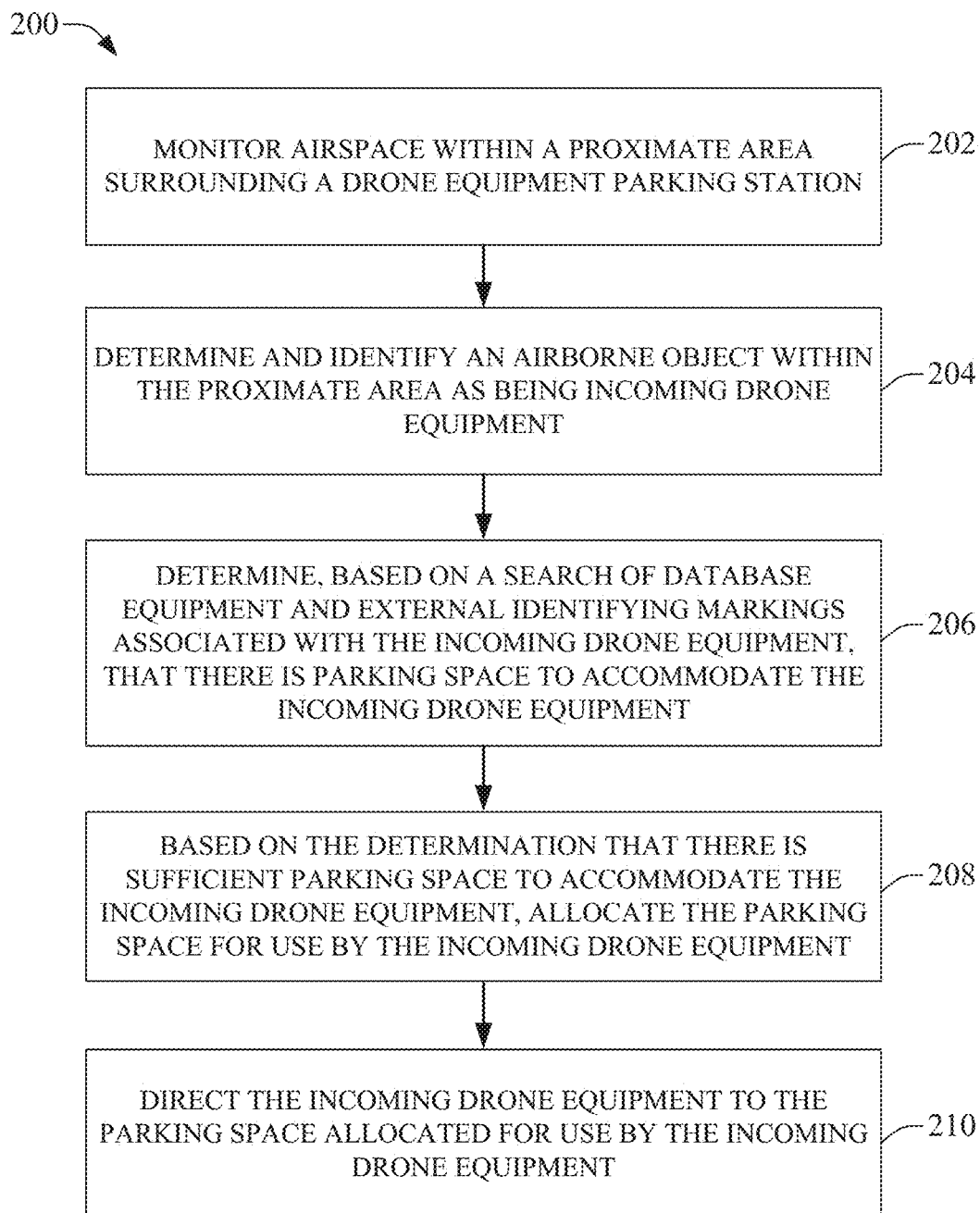
FIG. 2 provides depiction of a flow chart or method for provisioning of one-stop parking, charging, storage, and/or maintenance facilities and/or functionalities for drone equipment, in accordance with aspects of the subject disclosure.

FIG. 2 illustrates a method 200 that can be used for the provisioning of one-stop parking, charging, storage, and/or maintenance facilities and/or functionalities for drone equipment. Method 200 can be implemented on network equipment, such as network equipment 100. Method 200 can commence at act 202 wherein network equipment 100 (e.g., analysis engine 102) can monitor airspace within a defined and proximate area surrounding a drone equipment parking station. At act 204, analysis engine 102 can determine and identify airborne objects that enter the airspace as being drone equipment. At act 206, analysis engine 102 can determine, based on a search of associated database equipment and any external identifying markings associated with the external surfaces of the identified drone equipment whether there is parking space available to accommodate the incoming drone equipment, and where necessary any cargo that the incoming drone may be carrying. At act 208, analysis engine 102, in response to and based on the determination that there is sufficient space to accommodate the incoming drone (and its associated cargo), can allocate a parking space for use by the incoming drone equipment. At act 210, analysis engine 102 can direct the incoming drone to the parking space that has been allocated for use by the incoming drone equipment.

Figure 3:
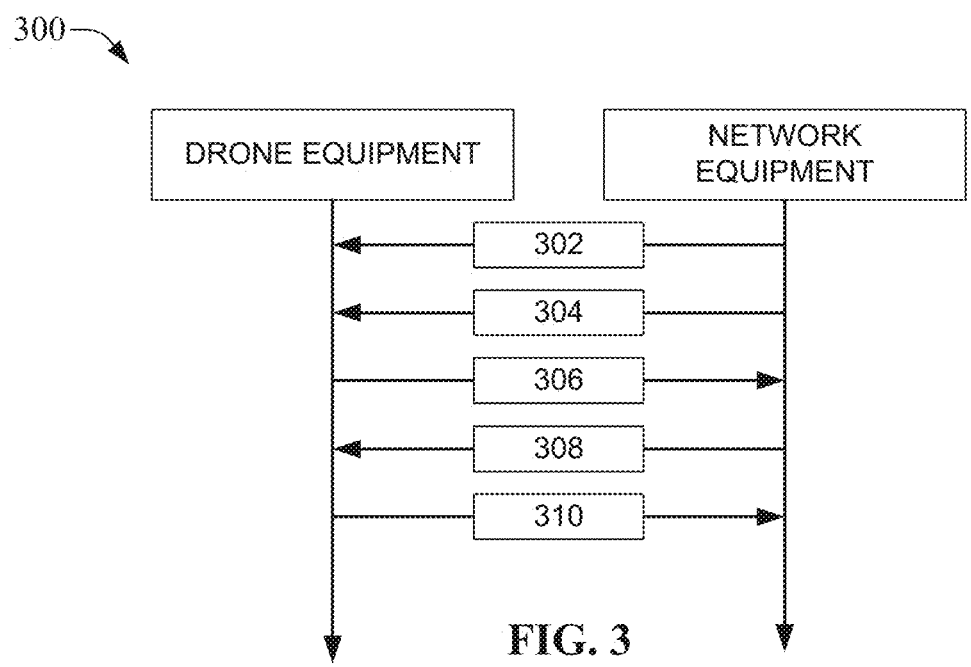
FIG. 3 provides illustration of a time sequence chart for provisioning of one-stop parking, charging, storage, and/or maintenance facilities and/or functionalities for drone equipment, in accordance with aspects of the subject disclosure.

FIG. 3 illustrated is a timing sequence diagram 300 that can be used for the provisioning of one-stop parking, charging, storage, and/or maintenance facilities and/or functionalities for drone equipment. As represented in FIG. 3, at act 302 network equipment (e.g., network equipment 100) can establish a communication channel with incoming drone equipment by scanning for open wireless communication modalities (e.g., Bluetooth, near field communication (NFC), or Wi-Fi connections) associated with the drone equipment. Once a communication channel has been established between the network equipment and the incoming drone equipment, the network equipment, at act 304, can query the drone equipment to supply its claimed specification details. At act 306, the incoming drone equipment can respond with its specification details (e.g., dimensioning details associated with the incoming drone equipment). The network equipment will then determine whether the specification details supplied by the drone equipment match those that can have been determined by network equipment during an earlier visual scan of the incoming drone equipment using computer vision AI. Where there is a match, network equipment can further query, at act 308, the incoming drone equipment regarding ownership entity details and relevant details regarding any freight that the drone may be carrying. At act 310, the drone equipment can supply its ownership entity details and details regarding the freight that it might be carrying. At this point the network equipment can determine whether the ownership entity has pre-paid for services supplied by the parking station and/or whether the ownership entity has a valid line of credit with the parking station. Additionally, based on the confirmed dimensional details of the drone equipment and/or the ownership entity data, network equipment can commence communication with the drone equipment to ascertain the services and/or maintenance that may be required by the incoming drone equipment.

Figure 4:
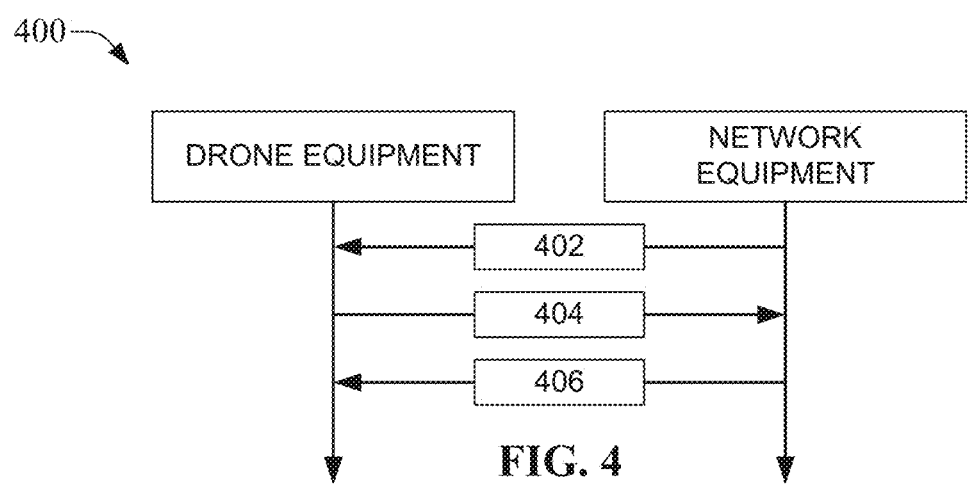
FIG. 4 provides illustration of a time sequence chart for provisioning of one-stop parking, charging, storage, and/or maintenance facilities and/or functionalities for drone equipment, in accordance with aspects of the subject disclosure.

FIG. 4 provides illustration of an additional timing sequence diagram 400 that can be used for the provisioning of one-stop parking, charging, storage, and/or maintenance facilities and/or functionalities for drone equipment. As depicted in FIG. 4, time sequence diagram can commence at act 402 where the network equipment can use sensor equipment to train and track an incoming airborne object. As the sensor equipment trains and tracks the incoming airborne object network equipment can determine whether the incoming airborne object is drone equipment or some other object, such as airborne debris (e.g., floating signage due to inclement weather). Where network equipment determines that the incoming airborne object is incoming drone equipment, network equipment can attempt to establish a wireless communication channel with the incoming drone equipment at act 404. In order to establish the wireless communication channel with the incoming drone, network equipment can prompt the incoming drone to identify itself and state its purpose for approaching the parking station. At act 406, the incoming drone can respond to the queries presented by the network equipment to the incoming drone equipment. Should the drone equipment not be satisfied with the bona fides of the responses returned by the incoming drone equipment, network equipment can facilitate the departure of the drone equipment from the airspace being monitored by network equipment. Additionally network equipment can report the drone equipment to the appropriate authorities.

Figure 5:
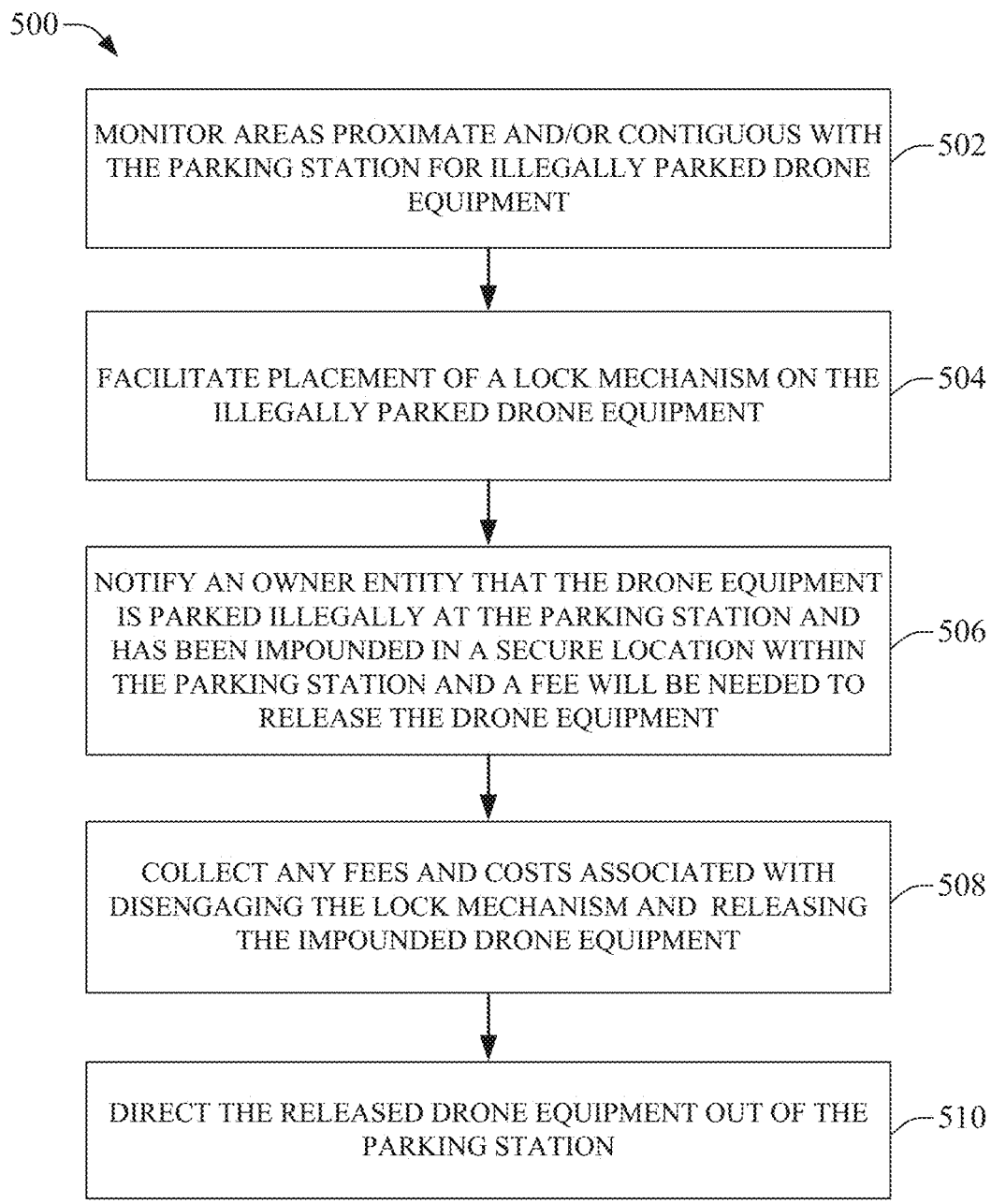
FIG. 5 provides illustration of a flow chart or method for provisioning of one-stop parking, charging, storage, and/or maintenance facilities and/or functionalities for drone equipment, in accordance with aspects of the subject disclosure.

FIG. 5 illustrates a method 500 for the provisioning of one-stop parking, charging, storage, and/or maintenance facilities and/or functionalities for drone equipment. Method 500 can commence at act 502 wherein network equipment (e.g., network equipment 100 and associated analysis engine 102) can monitor areas proximate and/or contiguous with a parking station for illegally parked drone equipment. At act 504 when network equipment determines that there are illegally parked drone equipment in the areas proximate to and/or contiguous with the parking station, network equipment can facilitate the placement or attachment of lock mechanisms to the illegally parked drone equipment. At act 506, network equipment can notify an owner entity that the illegally parked drone equipment is illegally parked at the parking station, that the drone equipment has been impounded in a secure location within the parking station, and that a fees are due in order to disengage the lock mechanisms and release the drone equipment from being impounded in the secure location. At 508, network equipment can collect any fees and/or costs associated with disengaging the lock mechanisms and releasing the drone equipment from being impounded. At act 510, network equipment can direct the released drone equipment out of the parking station.

Figure 6:
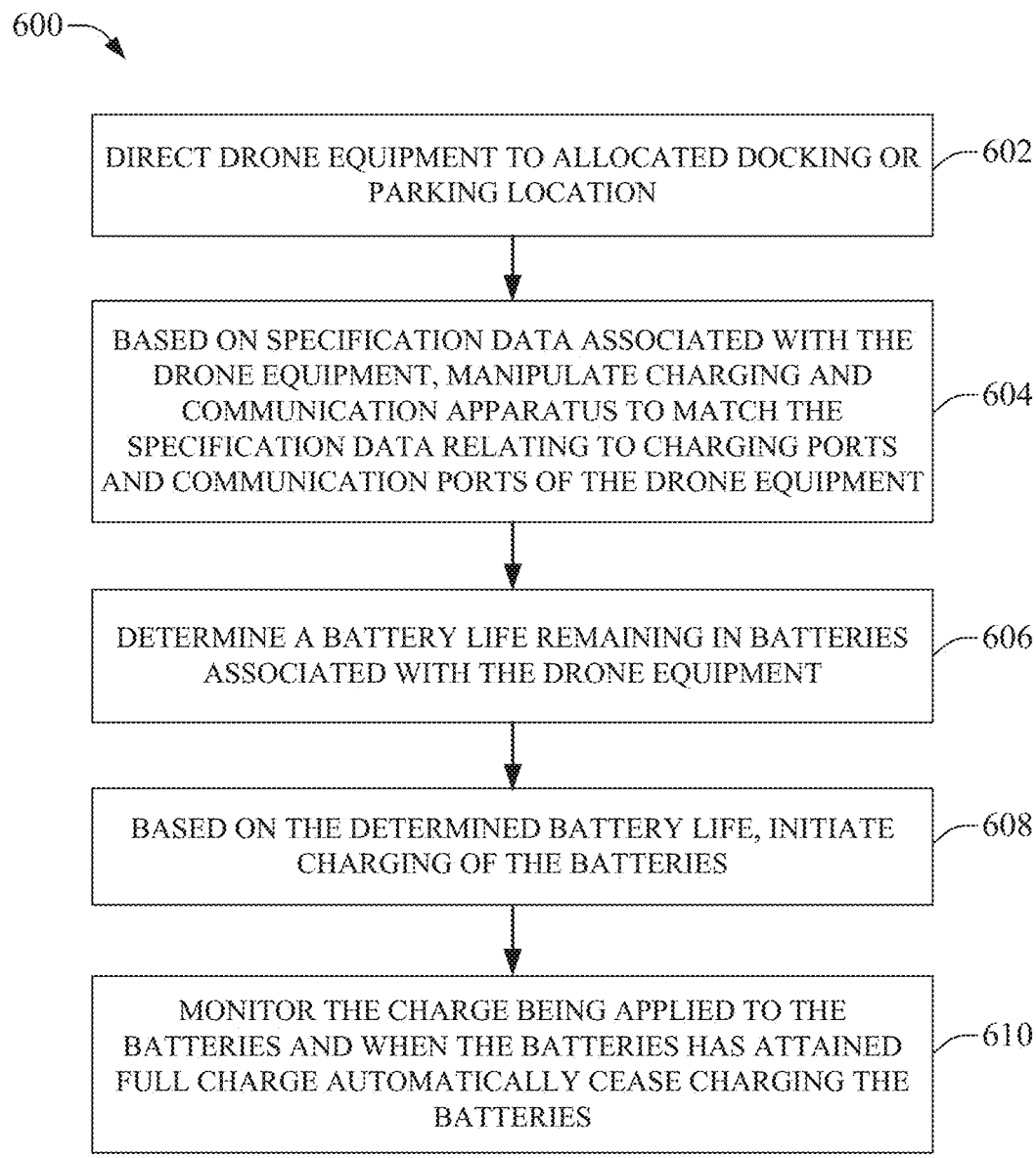
FIG. 6 provides depiction of a flow chart or method for provisioning of one-stop parking, charging, storage, and/or maintenance facilities and/or functionalities for drone equipment, in accordance with aspects of the subject disclosure.

FIG. 6 depicts another method 600 for the provisioning of one-stop parking, charging, storage, and/or maintenance facilities and/or functionalities for drone equipment. Method 600 can begin at act 602 where network equipment can direct drone equipment to an allocated parking or docking location. At act 604, based on specification data associated with the drone equipment, network equipment can facilitate or effectuate manipulation and adjustment of charging and/or communication apparatuses to match the specification data relating to charging ports and communication ports associated with the drone equipment. At act 606, network equipment can determine whether batteries associated with drone equipment need to be charged or recharged. At act 608, based at least in part on the batteries associated with drone equipment needing to be charged or recharged, network equipment can facilitate charging the batteries. At act 610, network equipment can monitor the charge being applied to the batteries and when the batteries have achieved a full charge, network equipment can cease charging the batteries.

Figure 7:
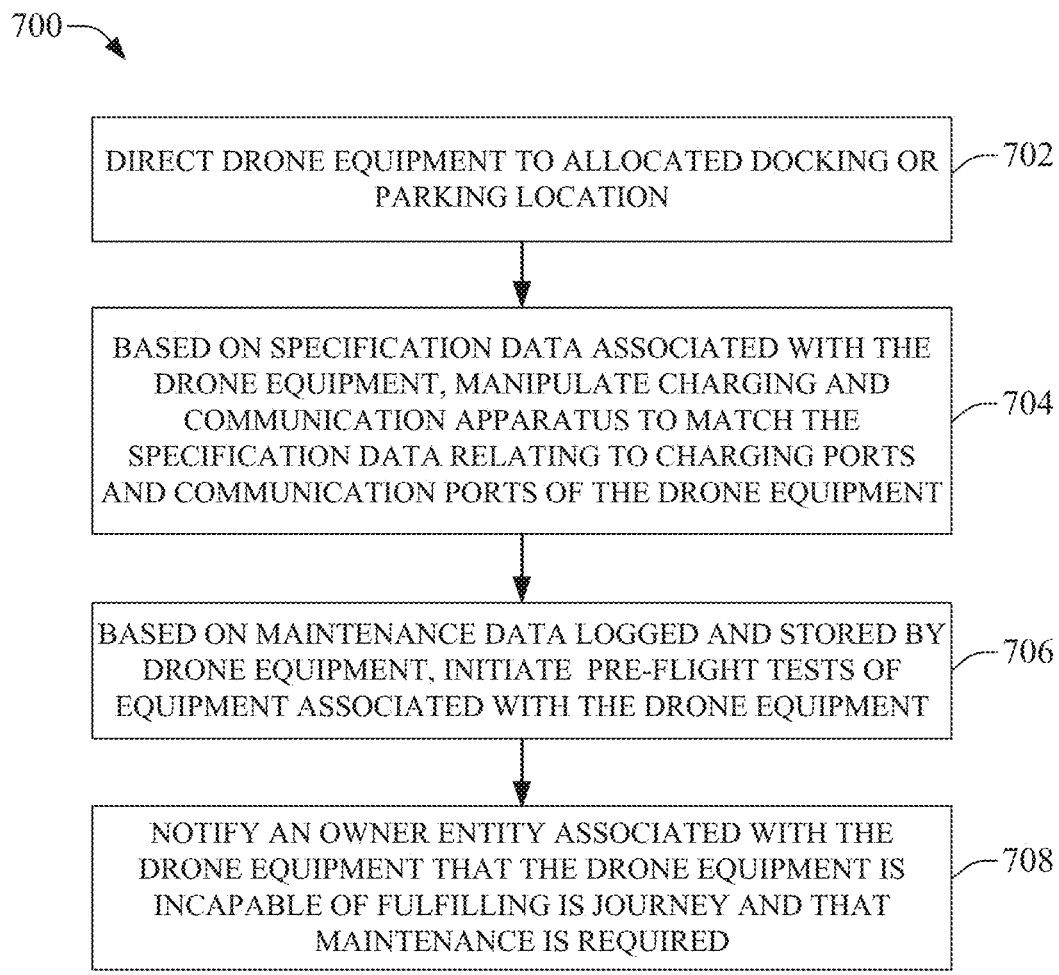
FIG. 7 provides illustration of a flow chart or method for provisioning of one-stop parking, charging, storage, and/or maintenance facilities and/or functionalities for drone equipment, in accordance with aspects of the subject disclosure.

FIG. 7 illustrates an additional method 700 for the provisioning of one-stop parking, charging, storage, and/or maintenance facilities and/or functionalities for drone equipment. At act 702 network equipment can direct drone equipment to an allocated parking or docking location. At act 704, based on specification data associated with the drone equipment, network equipment can facilitate or effectuate manipulation and adjustment of charging and/or communication apparatuses to match the specification data relating to charging ports and communication ports associated with the drone equipment. At act 706 network equipment can query drone equipment for maintenance records and other logged data that can have been persisted to memories associate with the drone equipment, and based at least in part of the maintenance records and other logged data, network equipment can initiate one or more pre-flight tests to ensure the airworthiness of the drone equipment and the capabilities of equipment associated with the drone equipment. At act 708, in instances where network equipment determines, based on the pre-flight testing that the drone equipment is not airworthy or is incapable of completing its mission, network equipment can notify an owner entity associated with the drone equipment that the drone equipment is incapable of sustained flight and/or will be unable to successfully complete is designated mission(s); and as such that maintenance is required.

Figure 8:
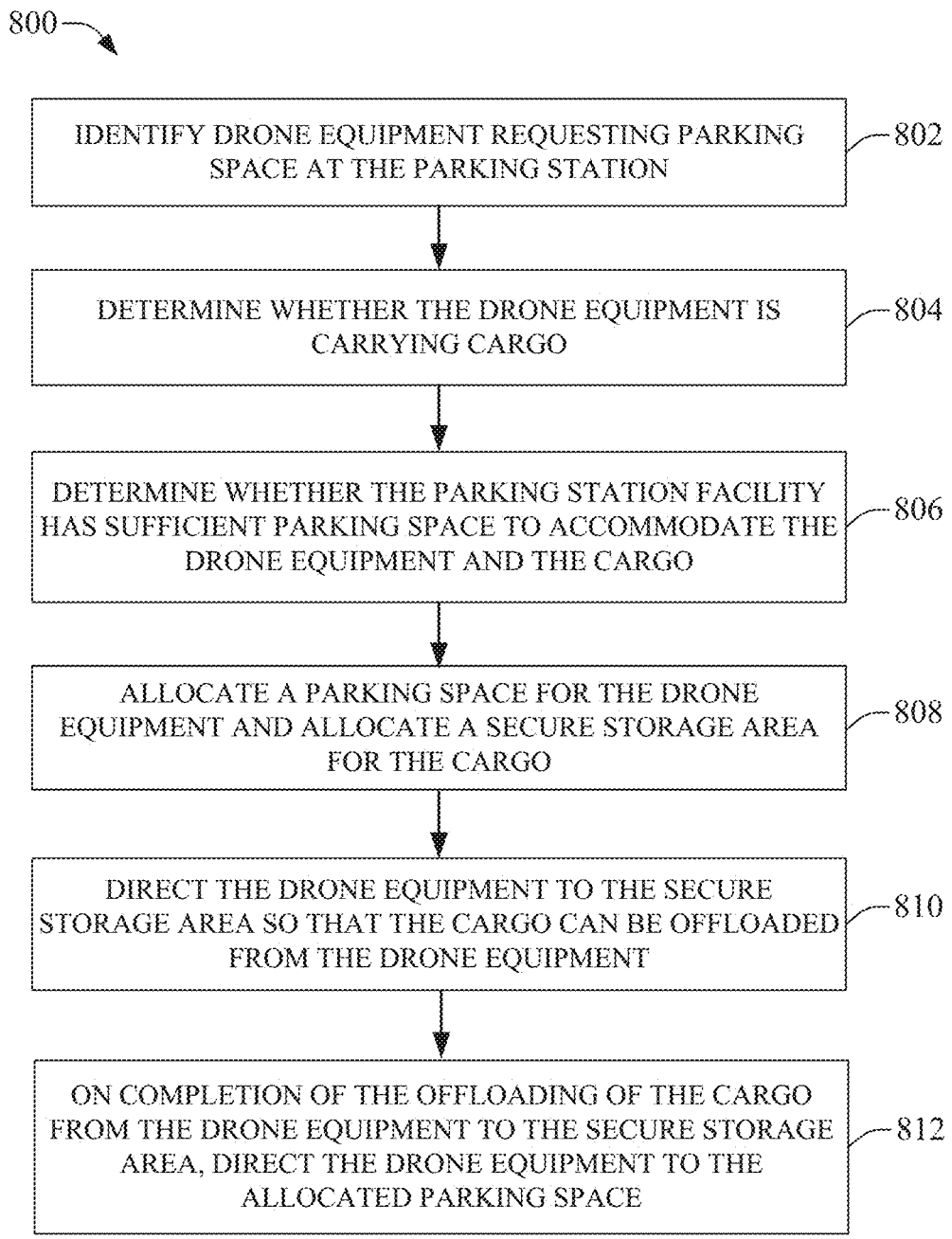
FIG. 8 provides depiction of a flow chart or method for provisioning of one-stop parking, charging, storage, and/or maintenance facilities and/or functionalities for drone equipment, in accordance with aspects of the subject disclosure.

FIG. 8 depicts a further method 800 for the provisioning of one-stop parking, charging, storage, and/or maintenance facilities and/or functionalities for drone equipment. Method 800 can commence at act 802 where network equipment can identify drone equipment requesting parking at the parking station. At act 804 network equipment can determine whether the drone equipment is carrying freight (cargo). At 806 network equipment can determine whether the parking station facility has sufficient parking space to accommodate the drone equipment and it associated freight. At 808 network equipment, in response to determining that there is ample space to accommodate the drone equipment and its associated freight, network equipment can allocation parking space for the drone equipment and further allocation a secure storage area for the freight. At act 810 network equipment can direct the drone equipment to the secure storage area where the freight can be offloaded from the drone equipment. At act 812, network equipment, on completion of the offloading of the freight from the drone equipment, can direct the drone equipment from the location of the secure storage area to the parking space allocated for use by the drone equipment.

Figure 9:
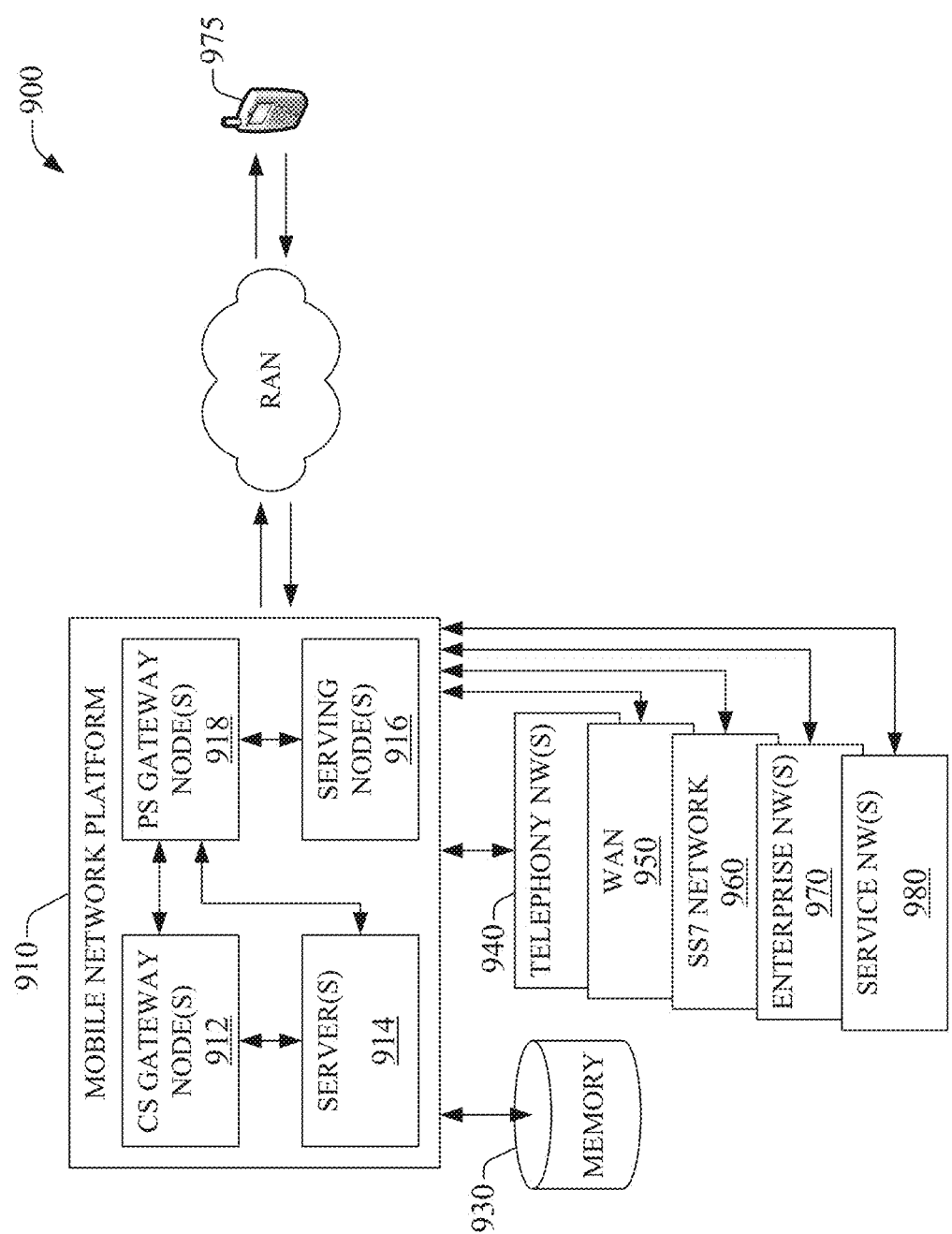
FIG. 9 is a block diagram of an example embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
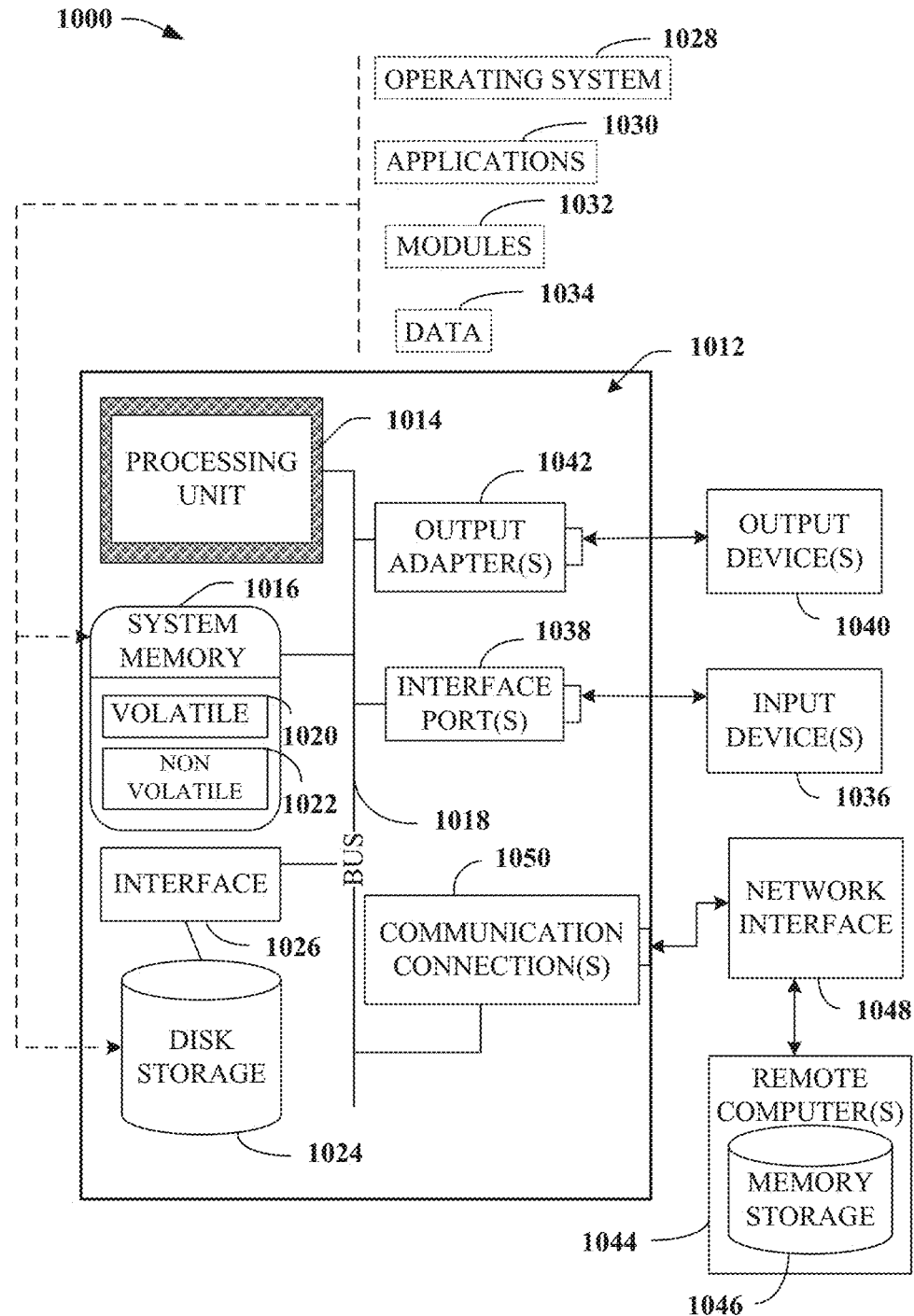
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 100, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MS A), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A Network equipment, comprising:
a processor; and
a memory that stores instructions, wherein the processor is configured to:
  identify drone equipment entering a defined airspace monitored by the network equipment;
  establish a communication channel with the drone equipment;
  in response to establishing the communication channel, receive data representing a physical dimension associated with the drone equipment;
  based on the physical dimension associated with the drone equipment, allocate a parking space within a defined area for the drone equipment to land;
  transmit, via the communication channel, message data representing a message to the drone equipment that the drone equipment navigate to the parking space; and
  in response to determining that other drone equipment, other than the drone equipment, is illegally parked contiguous to or proximate to the parking space, initiate placement of a lock on the second drone equipment that renders the second drone equipment inoperable.

2. The network equipment of claim 1, where the processor is further configured to use a group of sensors to track the drone equipment in response to the drone equipment being determined to have entered the defined airspace.

3. The network equipment of claim 2, wherein the group of sensors comprises a radar sensor.

4. The network equipment of claim 2, wherein the group of sensors comprises a lidar sensor.

5. The network equipment of claim 2, wherein the group of sensors comprises camera equipment that captures first electromagnetic radiation associated with first wavelengths longer than visible light wavelengths associated with a humanly perceivable light spectrum.

6. The network equipment of claim 5, wherein the camera equipment further captures second electromagnetic radiation associated with second wavelengths shorter than the visible light wavelengths.

7. The network equipment of claim 5, wherein the camera equipment further captures second electromagnetic radiation associated with the visible light wavelengths.

8. The network equipment of claim 1, wherein the processor is further configured to identify the drone equipment based on identifying markings attached to a surface skin of the drone equipment.

9. The network equipment of claim 8, wherein the identifying markings comprise multidimensional bar code data.

10. The network equipment of claim 8, wherein the identifying markings comprise quick response code data.

11. The network equipment of claim 8, wherein the identifying markings comprise regulatory tag data, and wherein the regulatory tag data uniquely identifies the drone equipment as being registered with a regulatory governmental entity that regulates flying objects.

12. A method, comprising:
- identifying, by network equipment comprising a processor, a first drone device entering a defined airspace monitored by the equipment;
- establishing, by the network equipment, a communication channel with the first drone device;
- in response to establishing the communication channel, receiving, by the network equipment, data representing a physical dimension associated with the first drone device;
- based on the physical dimension associated with the first drone device, allocating, by the network equipment, a landing space within a defined area for the first drone device to land; and
- transmitting, by the network equipment to the first drone device via the communication channel, message data indicating to the first drone device that the first drone device navigate to the landing space; and
- in response to determining that a second drone device is illegally parked contiguous to or proximate to the landing space, facilitating, by the network equipment, attaching a lock on the second drone device.

13. The method of claim 12, further comprising receiving, by the network equipment, data detailing a freight being carried by the first drone device.

14. The method of claim 13, further comprising, based on the data detailing the freight being carried by the first drone device, allocating, by the network equipment, a secure storage area for the first drone device to use to offload the freight.

15. The method of claim 14, wherein the secure storage area is contiguous with the defined area.

16. The method of claim 14, wherein the secure storage area is remote from the defined area, and wherein the message data further indicates to the first drone device that the first drone device is to navigate to the secure storage area to offload the freight.

17. The method of claim 12, further comprising querying, by the network equipment, a data store to access, based on identification markings affixed to or integrated with a skin of the first drone device, data representing a location of charging ports associated with the first drone device.

18. The method of claim 12, further comprising querying, by the network equipment, a data store to access, based on identification markings affixed to or integrated with a skin of the first drone device, data representing a location of physical access and physical communication ports associated with the first drone device.

19. A non-transitory machine-readable medium, comprising executable instructions that, when executed by a processor, facilitate performance of operations, comprising:
- identifying a first drone entering a defined airspace monitored by network equipment;
- in response to establishing a communication channel with the first drone, receiving data representing a physical dimension associated with the first drone;
- based on the physical dimension associated with the first drone, allocating a space within a defined area to which the first drone is to navigate and then cease moving;
- sending, to the first drone via the communication channel, notification data that notifies the first drone to navigate to the space; and
- in response to determining that a second drone is illegally parked contiguous to or proximate to the space, initiating, by the equipment, impoundment of the second drone to a secured location within the defined area.

20. The non-transitory machine-readable medium of claim 19, wherein the operations further comprise using a multiparty block chain verification process to determine an identity of an owner entity associated with ownership of the first drone.

* * * * *